United States Patent
Son et al.

(10) Patent No.: US 10,921,145 B2
(45) Date of Patent: Feb. 16, 2021

(54) HYBRID ELECTRIC VEHICLE AND METHOD OF SEARCHING FOR PATH THEREOF

(71) Applicants: Hyundai Motor Company, Seoul (KR); Kia Motors Corporation, Seoul (KR)

(72) Inventors: Hui Un Son, Gyeonggi-do (KR); Joon Young Park, Seoul (KR); Jea Mun Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 58 days.

(21) Appl. No.: 16/203,228

(22) Filed: Nov. 28, 2018

(65) Prior Publication Data

US 2019/0178662 A1 Jun. 13, 2019

(30) Foreign Application Priority Data

Dec. 12, 2017 (KR) .................. 10-2017-0170026

(51) Int. Cl.
*G01C 21/34* (2006.01)
*B60W 20/13* (2016.01)
*B60W 20/12* (2016.01)

(52) U.S. Cl.
CPC ......... *G01C 21/3469* (2013.01); *B60W 20/12* (2016.01); *B60W 20/13* (2016.01); *G01C 21/3492* (2013.01)

(58) Field of Classification Search
CPC .......... G01C 21/3469; G01C 21/3492; B60W 20/12; B60W 20/13; B60W 50/0097; B60W 2050/0039; B60W 2050/0031; B60W 2510/244; B60W 2710/244; B60W 2555/20; B60W 2556/50; B60W 2554/00; B60W 2552/20; B60K 6/387; B60K 6/48; B60K 2006/4825
(Continued)

(56) References Cited

U.S. PATENT DOCUMENTS

| | | | |
|---|---|---|---|
| 8,543,305 B2* | 9/2013 | Heise | B60T 17/18 701/70 |
| 2010/0088012 A1* | 4/2010 | O'Sullivan | G01C 21/3469 701/532 |

(Continued)

*Primary Examiner* — Muhammad Shafi
(74) *Attorney, Agent, or Firm* — Mintz Levin Cohn Ferris Glovsky; Peter F. Corless

(57) ABSTRACT

A hybrid electric vehicle that searches for a path based on efficiency in consideration of powertrain characteristics of the vehicle and a searching method thereof are provided. The method includes acquiring driving environment information and determining a driving load of the vehicle in each of a plurality of sections of at least one path from a point of departure to a destination. Output energy and brake energy are determined in each of the sections based on the determined driving load and consumption energy and regeneration energy are determined in each of the sections based on the output and brake energies in each of the sections. Energy consumption is determined in each of the at least one path by summing the consumption and regeneration energies in the sections and an energy minimization path is determined by comparing the determined energy consumptions on the at least one path.

9 Claims, 5 Drawing Sheets

(58) Field of Classification Search
USPC .......................................................... 701/410
See application file for complete search history.

(56) References Cited

U.S. PATENT DOCUMENTS

| 2014/0139150 | A1* | 5/2014 | Morisaki | B60L 15/20 |
| | | | | 318/139 |
| 2016/0129904 | A1* | 5/2016 | Shin | B60W 30/182 |
| | | | | 701/22 |
| 2017/0096078 | A1* | 4/2017 | Shin | B60L 58/20 |

* cited by examiner $E_{sum} = E_{output1} + E_{output2} + E_{output3}$

HYBRID ELECTRIC VEHICLE AND METHOD OF SEARCHING FOR PATH THEREOF

CROSS-REFERENCE TO RELATED APPLICATION(S)

This application claims the benefit of Korean Patent Application No. 10-2017-0170026, filed on Dec. 12, 2017, which is hereby incorporated by reference as if fully set forth herein.

BACKGROUND

Field of the Invention

The present invention relates to a hybrid electric vehicle and a method of searching for a path thereof, and more particularly, to a hybrid electric vehicle that searches for a path based on efficiency in consideration of powertrain characteristics of the hybrid electric vehicle and a method of controlling the same.

Discussion of the Related Art

Recently, according to development of navigation systems, path guidance methods in which shortest distance paths or real-time traffic situations are reflected and also path guidance methods in which fuel consumption is considered are being developed. For example, a path search method in which a path having low fuel consumption is searched for in consideration of traffic information, the number of traffic lights, the number of turns, slopes of roads, etc., may be considered. In particular, a driving load of a vehicle on each of a plurality of paths reaching a destination may be calculated in consideration of characteristics of roads and traffic situations.

For example, a driving load $F_{load}$ of a vehicle may be calculated by Equation "$F_{load} = ma + F_{aero} + F_{R.R.} + mg \sin \theta$" wherein, m represents a weight of the vehicle, a represents an acceleration of the vehicle, $F_{aero}$ represents air resistance, $F_{R.R.}$ represents rolling resistance of the vehicle, and $\theta$ represents a slope of a current driving road. Particularly, the slope $\theta$ of the current driving road may be acquired using navigation information, and the rolling resistance $F_{R.R.}$ and weight m of the vehicle may be constants, and air resistance $F_{aero}$ may be calculated using weather information (e.g., temperature, wind direction, wind velocity, humidity, etc.) and a speed of the vehicle.

A method, in which, when a driving load is calculated, the calculated driving load is converted into energy consumption, i.e., fuel consumption, total fuel consumptions on the respective paths are compared and thus the path having the lowest total fuel consumption is selected, may be considered. This will be described with reference to FIG. 1 of the related art.

FIG. 1 is a graph illustrating one example of a general method of calculating energy consumption in consideration of a driving path. With reference to FIG. 1, a path on which energy consumption is calculated includes a flatland section, an uphill section and a downhill section. Energy consumptions $E_{output1}$, $E_{output2}$ and $E_{output3}$ in the respective sections may be calculated by multiplying a driving load by the distances of the respective sections, and the energy consumption $E_{output3}$ in the downhill section may be zero (i.e., $E_{output3} = 0$) unless a driver separately accelerates the vehicle. Accordingly, total energy consumption $E_{sum}$ on the path may be calculated as "$E_{output1} + E_{output2} + E_{output3}$".

In general, demand for eco-friendly vehicles is increasing according to demand for improvement in fuel efficiency of vehicles and reinforcement of emission regulations of respective countries, and hybrid electric vehicles/plug-in hybrid electric vehicles (HEVs/PHEVs) are provided as an alternative. The hybrid electric vehicle may provide optimum output and torque base on how two power sources, i.e., an engine and a motor, are harmoniously operated during a process of driving the hybrid electric vehicle using the engine and the motor. Particularly, in a hybrid electric vehicle employing a parallel type or transmission mounted electric device (TMED) type hybrid system in which an electric motor and an engine clutch (EC) are mounted between an engine and a transmission, output of the engine and output of the motor may be simultaneously transmitted to a drive shaft.

In a general situation of a hybrid electric vehicle, in initial acceleration, electric energy is used (i.e., an EV mode). However, since there is a limit in satisfying driver's request power using electric energy alone, a moment at which an engine is used as a main power source occurs (i.e., an HEV mode). In particular, in the hybrid electric vehicle, when a difference between revolutions per minute (RPM) of a motor and RPM of the engine is within a designated range, an engine clutch is closed to rotate the motor and the engine simultaneously.

However, the above-described energy consumption calculation method with reference to FIG. 1 is described only in terms of an internal combustion engine and, thus, if such a method is applied to an eco-friendly vehicle, such as a hybrid electric vehicle, optimum energy efficiency cannot be secured. Particularly, although a path is ineffective to an internal combustion engine vehicle, a hybrid electric vehicle along such a path may recover energy through regenerative braking and, thus, the path may be effective to the hybrid electric vehicle.

For example, a path having many uphill/downhill sections and deceleration occurrence may be ineffective in terms of fuel consumption of an internal combustion engine vehicle, but may serve as an optimum path for a hybrid electric vehicle executing regenerative braking. Such regenerative braking is influenced by a state of charge (SOC) of a battery and thus is not always executable and, when the SOC is low when use of driving power of an electric motor alone is effective, output of the electric motor is limited and thus power of an engine should be used.

Consequently, at a high SOC, a quantity of regeneration is limited and thus a path on which a downhill section comes after an uphill section may be effective and, at a low SOC, power consumed by the engine is increased and thus a path on which an uphill section comes after a downhill section may be effective. Due to these characteristics, there is a limit in searching for a path suitable for eco-friendly vehicles using the conventional path search method which minimizes fuel consumption, applied to general internal combustion engine vehicles.

SUMMARY

Accordingly, the present invention provides a hybrid electric vehicle and a method of searching for a path thereof that substantially obviate one or more problems due to limitations and disadvantages of the related art. An object of the present invention is to provide a method of searching for a path based on efficiency in consideration of characteristics of eco-friendly vehicles and a vehicle performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to the purpose of the invention, as embodied and broadly described herein, a method of searching for a path of a hybrid electric vehicle may include acquiring driving environment information, determining a driving load of the vehicle in each of a plurality of sections of at least one path from a point of departure to a destination, determining output energy and brake energy in each of the sections based on the determined driving load, determining consumption energy and regeneration energy in each of the sections based on the output energy and the brake energy in each of the sections, determining energy consumption on each of the at least one path by summing the consumption energies and the regeneration energies in the sections, and determining an energy minimization path by comparing the determined energy consumptions on the at least one path.

In another aspect of the present invention, a hybrid electric vehicle may include a first controller configured to acquire driving environment information, and a second controller configured to determine an energy minimization path using the driving environment information and to transmit information regarding the determined energy minimization path to the first controller.

The second controller may include a driving load calculation unit configured to determine a driving load of the vehicle in each of a plurality of sections of at least one path from a point of departure to a destination using the driving environment information received from the first controller, an output/brake energy calculation unit configured to determine output energy and brake energy in each of the sections based on the determined driving load, a consumption/regeneration energy calculation unit configured to calculate consumption energy and regeneration energy in each of the sections based on the output energy and the brake energy in each of the sections, and a path determination unit configured to determine energy consumption on each of the at least one path by summing the consumption energies and the regeneration energies in the sections, and to determine the energy minimization path by comparing the determined energy consumptions on the at least one path.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
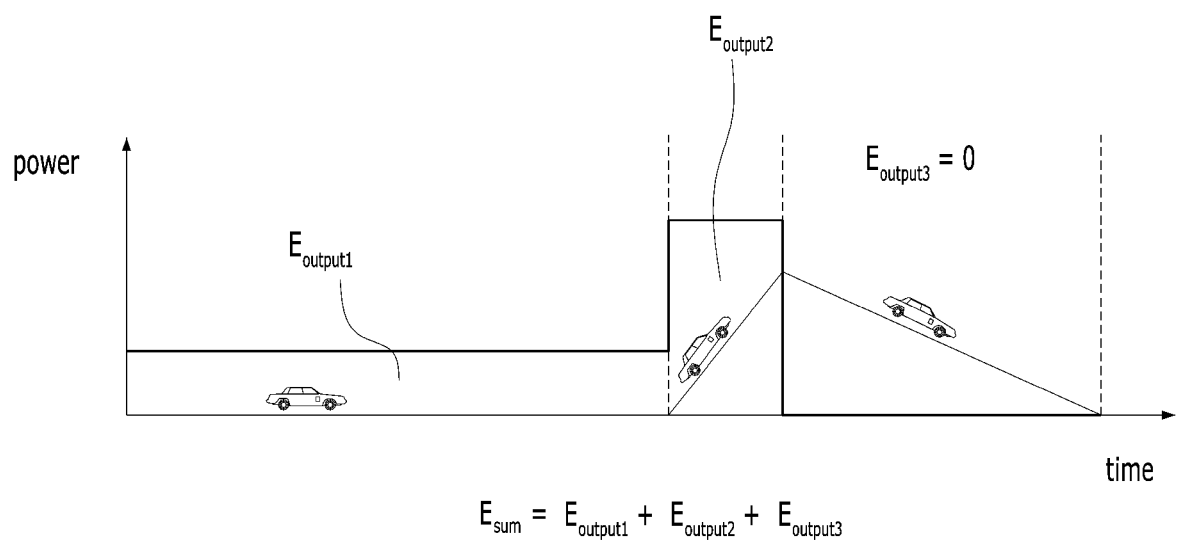
FIG. 1 is a graph illustrating a general method of calculating energy consumption in consideration of a driving path according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. However, the disclosure of the invention is not limited to the exemplary embodiments set forth herein and may be variously modified. In the drawings, in order to clearly describe the present invention, description of elements which are not related to the present invention is omitted, and the same or similar elements are denoted by the same reference numerals even though they are depicted in different drawings. In the drawings, the same or similar elements are denoted by the same reference numerals even though they are depicted in different drawings.

Prior to description of a method of searching for a path of a hybrid electric vehicle in accordance with one exemplary embodiment of the present invention, a structure of a hybrid electric vehicle and mutual relations among powertrain controllers which are applicable to the exemplary embodiment will be described with reference to FIGS. 2 and 3.

Figure 2:
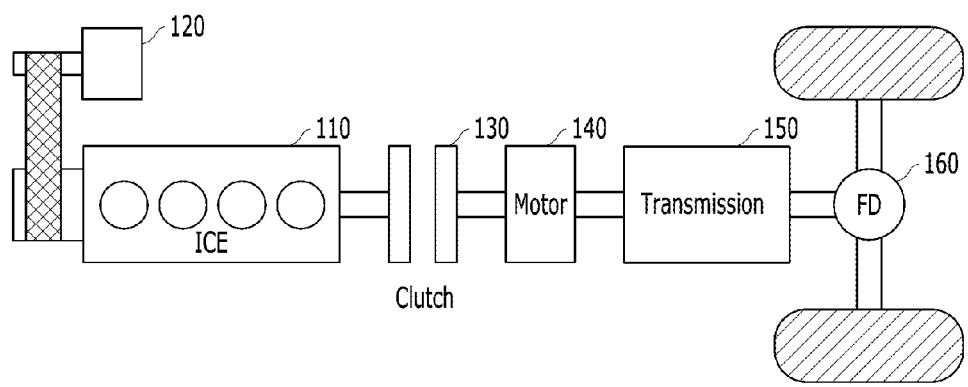
FIG. 2 is a view illustrating a powertrain structure of a hybrid electric vehicle which is applicable to exemplary embodiments of the present invention.

FIG. 2 is a view illustrating a powertrain structure of a general hybrid electric vehicle. FIG. 2 illustrates a powertrain of a hybrid electric vehicle employing a parallel type hybrid system in which an electric motor (or a driving motor) 140 and an engine clutch 130 may be mounted between an internal combustion engine (ICE) 110 and a transmission 150.

In such a hybrid electric vehicle, when an accelerator pedal is engaged after starting (i.e., an accelerator pedal sensor is turned on), the motor 140 may be first driven using power of a battery under the condition that the engine clutch 130 is opened, and power of the motor 140 may be transmitted to wheels via the transmission 150 and a final drive (FD) 160 and thus the wheels may be moved (i.e., the electric vehicle (EV) mode). When the vehicle is gradually accelerated and thus requires greater driving power, an auxiliary motor (or a starter generator motor) 120 may be operated to drive the ICE 110.

Accordingly, when RPMs of the ICE 110 and the motor 140 become equal, the engine clutch 130 may be closed and thus the vehicle may be driven using both the engine 110 and the motor 140 (i.e., transition from the EV mode to the hybrid electric vehicle (HEV) mode). When a predetermined engine off condition, such as deceleration of the vehicle, is satisfied, the engine clutch 130 may be opened and the ICE 110 may be stopped (i.e., transition from the HEV mode to the EV mode). In particular, the vehicle charges the battery through the motor 140 using driving power of the wheels and, such a situation is referred to as regeneration of brake energy or regenerative braking.

Therefore, the starter generator motor 120 may operate as a starter motor when the ICE 110 is started and as a generator when rotational energy of the ICE 110 is recovered after starting or when the ICE 110 is turned off, and thus the starter generator motor 120 may be referred to as a hybrid starter generator (HSG). In general, a stepped transmission or a multiple disc clutch transmission, for example, a dual clutch transmission (DCT), may be used as the transmission 150.

Figure 3:
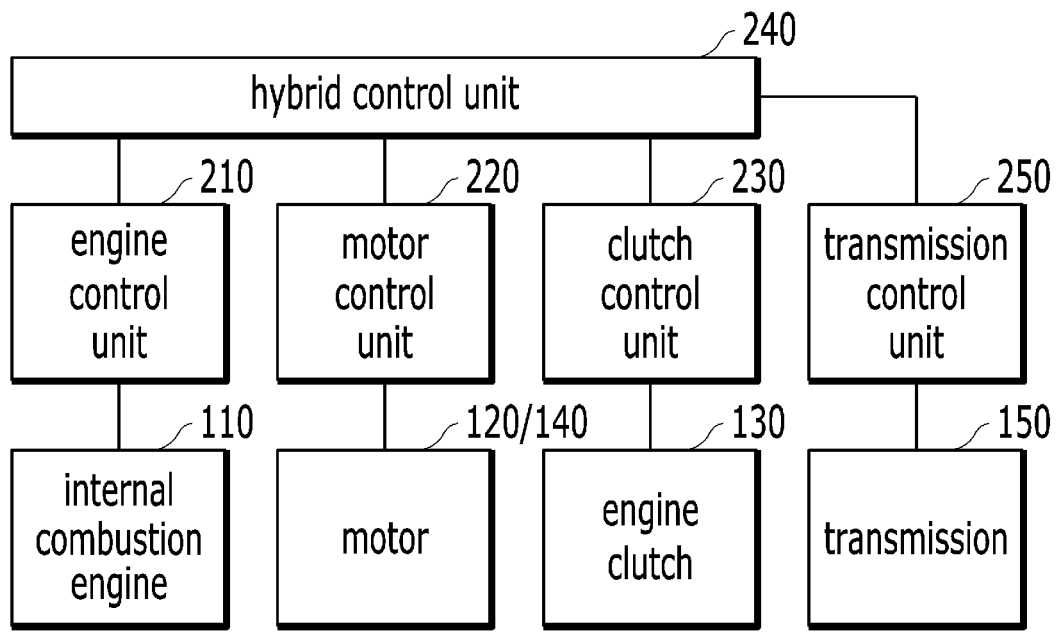
FIG. 3 is a block diagram illustrating a control system of a hybrid electric vehicle which is applicable to one exemplary embodiment of the present invention.

FIG. 3 is a block diagram illustrating a control system of a hybrid electric vehicle which is applicable to one exemplary embodiment of the present invention. With reference to FIG. 3, in the hybrid electric vehicle, an internal combustion engine 110 may be operated by an engine control unit 210, torques of a starter generator motor 120 and an electric motor 140 may be adjusted by a motor control unit (MCU) 220, and an engine clutch 130 may be operated by a clutch controller 230. Particularly, the engine control unit 210 may be referred to as an engine management system (EMS). Further, a transmission 150 may be operated by a transmission controller 250. In some cases, the starter generator motor 120 and the electric motor 140 may be respectively operated by separate controllers.

The respective controllers may be connected to an upper-level controller, i.e., a hybrid control unit (HCU) 240 configured to perform the entirety of a mode conversion process and may thus provide information to the hybrid controller 240 necessary to operate the engine clutch 130 in driving mode conversion and gear shift and/or information necessary to stop the internal combustion engine 110 or perform operation based on a control signal under the control of the hybrid controller 240.

In particular, the hybrid controller 240 may be configured to determine whether mode conversion is performed according to a driving state of the vehicle. For example, the hybrid controller 240 may be configured to determine a point in time when the engine clutch 130 is opened, and perform hydraulic pressure control (e.g., if the engine clutch 130 is a wet engine clutch) or torque capacity control (e.g., if the engine clutch 130 is a dry engine clutch) when the engine clutch 130 is opened. Further, the hybrid controller 240 may be configured to determine a state (e.g., lock-up, slip or opening) of the engine clutch 130 and control a point in time when fuel injection of the internal combustion engine 110 is stopped.

Further, to control stoppage of the internal combustion engine 110, the hybrid controller 240 may be configured to transmit a torque command to control torque of the starter generator motor 120 to the motor controller 220 and thus control recovery of engine rotational energy. Further, the hybrid controller 240 may be configured to calculate a current driver request torque using an accelerator pedal sensor (APS) value and a brake pedal sensor (BPS) value, and calculate request torque according to a virtual APS when a speed limiter is activated.

Notably, connection relations among the above-described controllers and functions/divisions of the respective controllers are exemplary and thus it will be apparent to those skilled in the art that the names of the controllers are not limited. For example, any one of other controllers except for the hybrid controller 240 may be implemented as having the functions of the hybrid controller 240, or the functions of the hybrid controller 240 may be distributed to two or more other controllers except for the hybrid controller 240.

Hereinafter, based on the above-described vehicle configuration, a method of searching for a path of a hybrid electric vehicle in accordance with one exemplary embodiment of the present invention will be described. One exemplary embodiment of the present invention provides a method of searching for a path, in which a driving load of an eco-friendly vehicle may be calculated using at least one of traffic information, geographic information or weather information, and minimum energy consumptions of respective sections from a point of departure to a destination are calculated in consideration of characteristics of the eco-friendly vehicle to minimize energy consumption.

The characteristics of the eco-friendly vehicle may include at least one of a driving load, a vehicle speed, or driving energy or regeneration energy according to an SOC. Hereinafter, a structure of a controller configured to execute path search will be described and, for convenience, it may be assumed that the hybrid controller 240 executes the path search.

Figure 4:
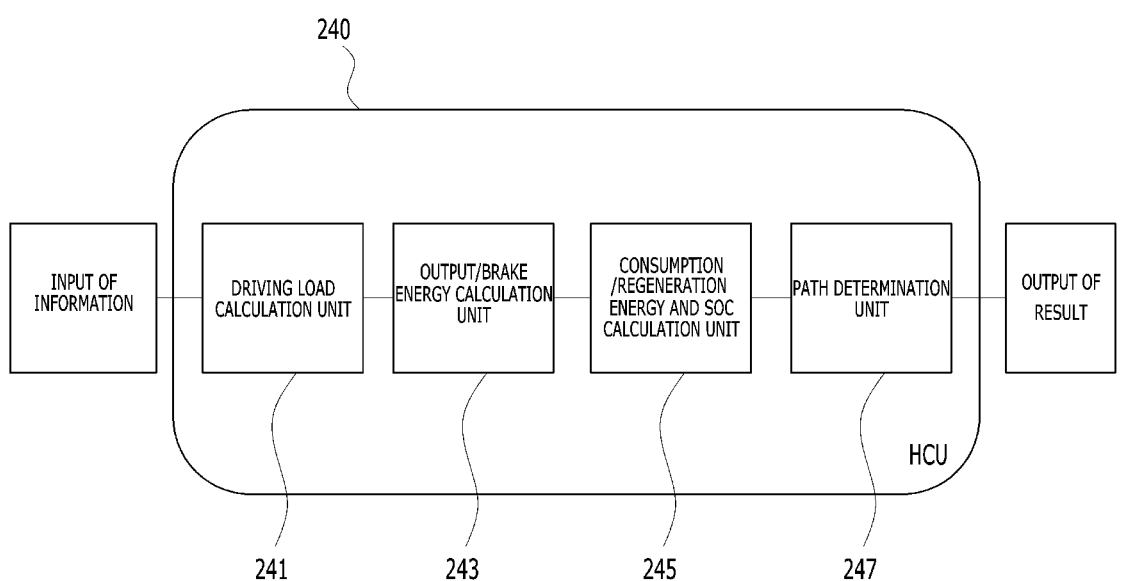
FIG. 4 is a block diagram illustrating a structure of a hybrid controller executing path search in accordance with one exemplary embodiment of the present invention.

FIG. 4 is a block diagram illustrating a structure of the hybrid controller executing path search in accordance with one exemplary embodiment of the present invention. With reference to FIG. 4, the hybrid controller 240 may include a driving load calculation unit 241, an output/brake energy calculation unit 243, a consumption/regeneration energy and SOC calculation unit 245, and a path determination unit 247. In FIG. 4, illustration of elements to perform general functions of the hybrid controller 240 is omitted.

First, information input to the driving load calculation unit 241 may be driving environment information which may influence energy change based on driving of the vehicle along each of at least one path located between a point of departure and a destination. For example, the driving environment information may include at least one of traffic information, geographic information or weather information.

The traffic information may include at least one cycle of traffic lights, an average speed in each section, acceleration/deceleration information in each section, or traffic jam degree/traffic volume information in each section. Further, the geographic information may include slope information of each section, section length information, etc. The weather information may include wind velocity, wind direction, rain, snow and humidity information, etc., which are required to calculate a driving load.

Although a subject of information input and a destination of result output in FIG. 4 may become an apparatus providing a navigation function, for example, an Audio/Video/Navigation (AVN) system, the present invention is not limited thereto, and any apparatus which may provide driving environment information acquired through a designated communication means or stored in advance may be employed.

Figure 5A:
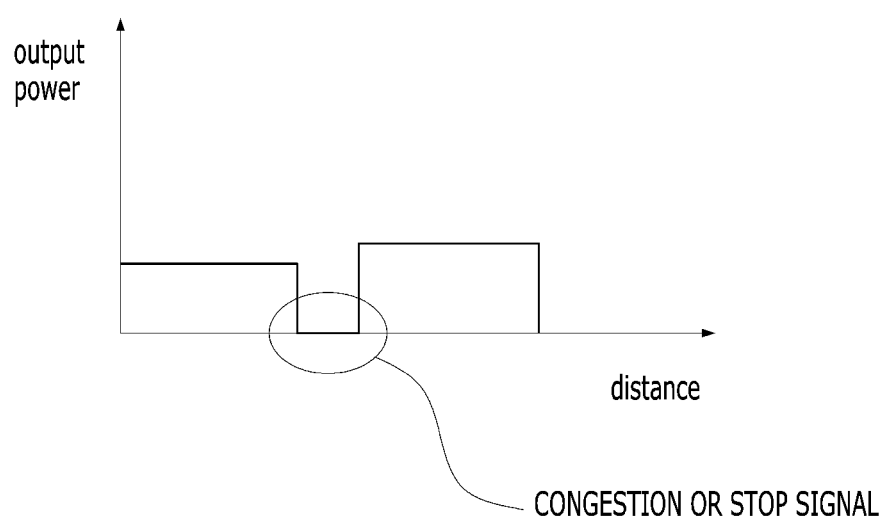
FIGS. 5A-5B are graphs illustrating a method of applying driving environment information to calculation of a driving load in accordance with one embodiment of the present invention.
Figure 5B:
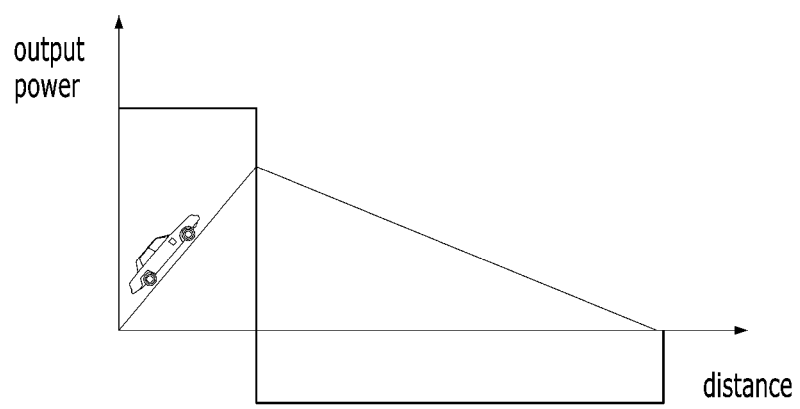

Hereinafter, the respective elements of the hybrid controller 240 will be described in detail with reference to FIGS. 5A-7B. First, operation of the driving load calculation unit 241 will be described with reference to FIGS. 5A_5B. In particular, FIGS. 5A-5B are graphs illustrating a method of applying driving environment information to calculation of a driving load in accordance with one embodiment of the present invention. With reference to FIG. 5A, even if a hybrid electric vehicle drives the same distance through the driving environment information, different driving loads according to average speeds of respective sections may be calculated and, if traffic light cycle information is referenced, a section in which there is no output of the powertrain through coasting according to change to a front stoplight may be determined.

Further, in the determination of the driving load, air resistance $F_{aero}$ may be calculated by Equation $F_{aero} = \frac{1}{2} \rho C_d A_f (V_x + V_{wind})^2$ wherein, $\rho$ represents air density, $C_d$ represents an air resistance coefficient, $V_x$ represents a vehicle speed, $V_{wind}$ represents wind velocity, and $A_f$ represents an area of a front portion of the vehicle. In some vehicles, information excluding information having a constant or information directly acquired by the vehicle, such as a vehicle speed, i.e., air density or wind velocity, may be directly/indirectly inferred from weather information. By considering air resistance, a path having a relatively long driving distance along which the vehicle is driven downwind rather than a path having the shortest driving distance along which vehicle is driven upwind may be selected.

In the determination of the driving load, the driving load calculation unit 241 may determine the driving load using slope information, as exemplarily shown in FIG. 5B. The driving load calculation unit 241 may be configured to calculate a driving load of the vehicle in each of a plurality of sections constituting each of at least one path from a point of departure to a destination using the driving environment information, as described above.

Figure 6:
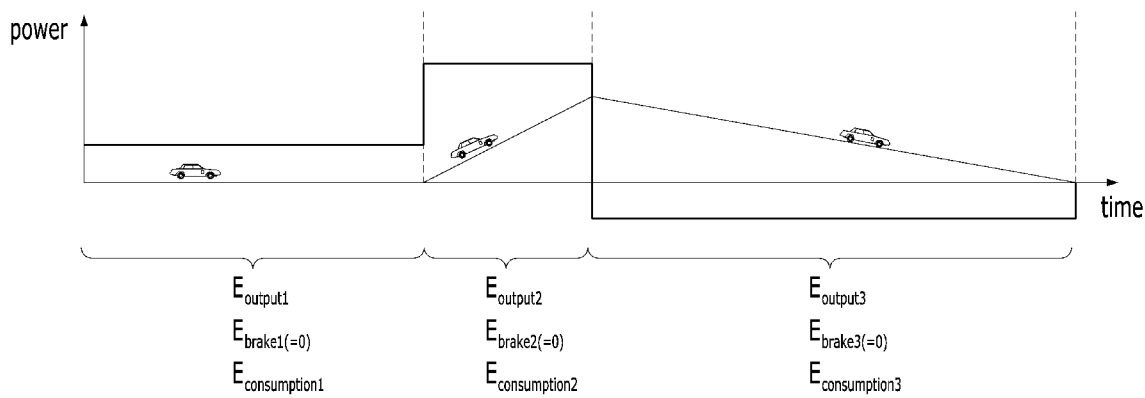
FIG. 6 is a graph illustrating a method of calculating energy in accordance with one exemplary embodiment of the present invention.
Figure 7A:
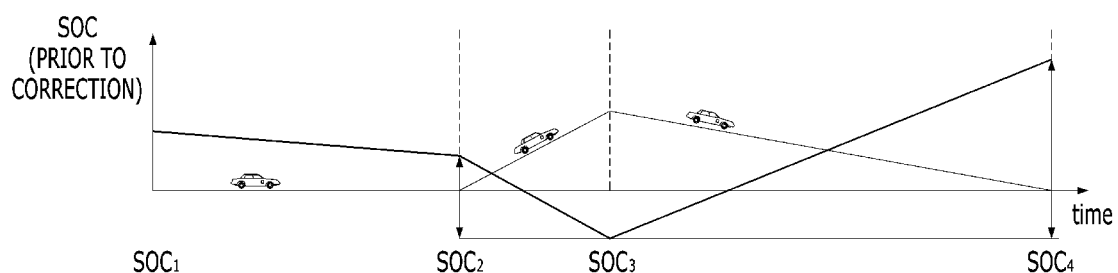
FIGS. 7A_7B are graphs illustrating a method of calculating and correcting an SOC in accordance with one exemplary embodiment of the present invention.
Figure 7B:
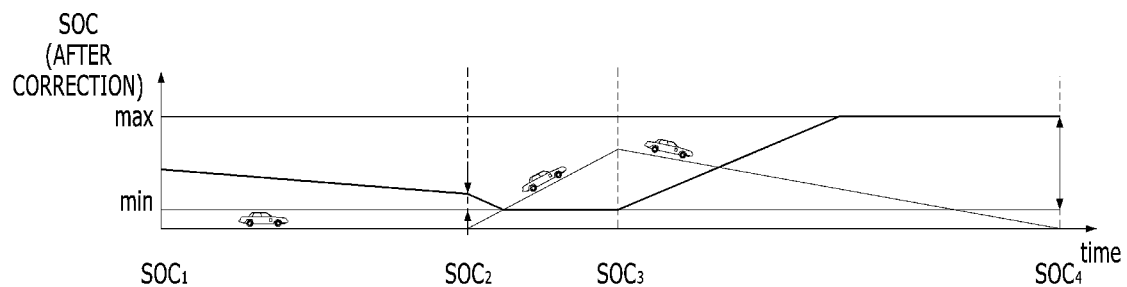

Next, operations of the output/brake energy calculation unit 243 and the consumption/regeneration energy and SOC calculation unit 245 will be described with reference to FIG. 6 and FIGS. 7A-7B. FIG. 6 is a graph illustrating a method of calculating energy in accordance with one exemplary embodiment of the present invention, and FIGS. 7A-7B are graphs illustrating a method of calculating and correcting an SOC in accordance with one exemplary embodiment of the present invention. In FIG. 6 and FIGS. 7A-7B, it may be assumed that one path is divided into three sections according to slope. In particular, an initial section is a flat section, a middle section is an uphill section having a shorter distance than that of the initial section, and a final section is a downhill section having a relatively long distance.

First, with reference to FIG. 6, the output/brake energy calculation unit 243 may be configured to determine output energy $E_{output}$ and brake energy $E_{brake}$ based on a driving load in each of the respective sections. For example, in the initial section, output energy $E_{output1}$ that corresponds to flatland driving may be required, and brake energy $E_{brake1}$ may be determined as 0 since there is no braking element. In the middle section, output energy $E_{output2}$ that corresponds to uphill driving may be required, and brake energy $E_{brake2}$ may be determined as 0 since there is no braking element. In the final section, output energy $E_{output3}$ may be determined as 0 since no output energy is required for downhill driving, and brake energy $E_{brake3}$ to prevent acceleration of the vehicle in the downhill section may be calculated.

When the output energy and the brake energy in each section are determined, the consumption/regeneration energy and SOC calculation unit 245 may be configured to determine consumption energy and regeneration energy by respectively applying output efficiency and regeneration efficiency to the output energy and the brake energy. For example, an output efficiency factor $\eta_1$ ($\eta_1 < 1$) when an energy source possessed by the vehicle is converted into wheel driving power may be applied to the output energy and, thus, the consumption energy $E_{consumption}$ may be calculated by Equation $E_{consumption} = E_{output}/\eta_1$. Further, an efficiency factor $\eta_2$ ($\eta_2 < 1$) when brake energy is generated and charges a battery may be applied to the brake energy and, thus, the regeneration energy $E_{regeneration}$ may be calculated by Equation $E_{regeneration} = E_{brake} \times \eta_2$.

Accordingly, in FIG. 6, the initial section and the middle section have output energy alone and consumption energies $E_{consumption1}$ and $E_{consumption2}$ may be calculated in the initial section and the middle section, and the final section has brake energy alone and regeneration energy $E_{regeneration3}$ may be calculated in the final section.

The consumption/regeneration energy and SOC calculation unit 245 may be configured to calculate an SOC using the consumption energy and the regeneration energy. In the calculation of the SOC, a ratio of fuel consumption and battery consumption in the consumption energy (i.e., $E_{consumption}=E_{consumption,engine}+E_{consumption,motor}$) may be determined, and the consumption energy ratio may be determined based on experimental map data based on a predicted SOC, a driving load, and a driving load change. When the consumption energy ratio is determined, energy necessary for driving may be subtracted from an SOC value when each of the respective sections is started, or regeneration energy may be added to the SOC value. For example, on the assumption that an SOC before the vehicle enters the initial section is defined as $SOC_1$, an SOC before the vehicle enters the middle section is defined as $SOC_2$, and an SOC before the vehicle enters the final section is defined as $SOC_3$, as exemplarily shown in FIG. 7A, the respective SOCs may be calculated below.

$$SOC_2=SOC_1-E_{consumption1,motor}$$

$$SOC_3=SOC_2-E_{consumption2,motor}$$

$$SOC_4=SOC_3+E_{regeneration3}$$

However, such a calculation may not accord with management of an SOC in an actual hybrid electric vehicle. For example, when the SOC reaches the maximum set value $SOC_{max}$, the SOC is not increased anymore and, when the SOC reaches the minimum set value $SOC_{min}$, it may be difficult to drive the electric motor. Therefore, an SOC change may be calculated through consumption energy and regeneration energy in each section, the SOC change may be applied to an SOC start value of the corresponding section, and correction may be executed according to whether an acquired SOC deviates from a range between the maximum and minimum set values.

In other words, the consumption/regeneration energy and SOC calculation unit 245 may be configured to correct energy consumption as being performed by the engine alone (i.e., $E_{consumption}=E_{consumption,engine}$, $E_{consumption,motor}=0$) if $SOC<SOC_{min}$, and correct the regeneration energy to zero ($E_{regeneration}=0$) if $SOC>SOC_{max}$. Accordingly, the maximum battery consumption energy $E_{consumption2,motor}$ which may be consumed in the middle section becomes "$SOC_2-SOC_{min}$", the maximum regeneration energy in the final section is "$SOC_{max}-SOC_{min}$", and, thus, actual SOCs may be corrected as below.

$$SOC_2=SOC_1-E_{consumption1,motor}$$

$$SOC_3=SOC_2-E_{consumption2,motor}=SOC_{min},E_{consumption2,motor}=SOC_2-SOC_{min}$$

$$SOC_4=SOC_3-E_{regeneration3}=SOC_{max},$$
$$E_{regeneration3}=SOC_{max}-SOC_{min}$$

When the consumption/regeneration energy and SOC calculation unit 245 determines consumption energy and regeneration energy in each section in consideration of the SOC, the path determination unit 247 may be configured to determine energy consumption on each of the respective paths by summing the consumption energies in the respective sections of each path, and determine a path having the lowest energy consumption by comparing the energy consumptions on the respective paths. Information regarding the determined path may be output to the outside (e.g., the navigation system may be configured to output the information to a driver within the vehicle).

Figure 8:
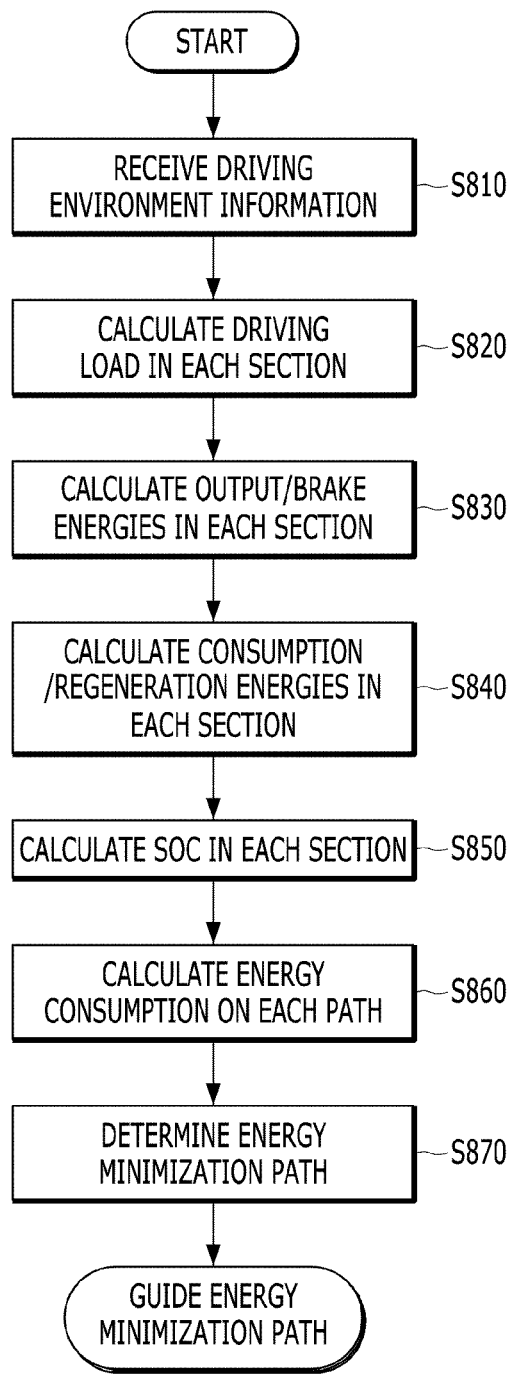
FIG. 8 is a flowchart illustrating a process of searching for a path in accordance with one exemplary embodiment of the present invention.

Hereinafter, the above-described process will be described in order with reference to FIG. 8. FIG. 8 is a flowchart illustrating a process of searching for a path in accordance with one exemplary embodiment of the present invention. With reference to FIG. 8, the hybrid controller of the vehicle may be configured to receive driving environment information according to occurrence of an energy minimization path search event (Operation S810).

A driving load $F_{load}$ of the vehicle in each of sections of each of a plurality of paths may be calculated through the driving environment information (e.g., $F_{load}=ma+F_{aero}+F_{R.R}+mg \sin \theta$) (Operation S820), output/brake energies in each section may be calculated based on the driving load $F_{load}$ (Operation S830), and consumption/regeneration energies in each section may be calculated based on the output/brake energies (Operation S840). A SOC in each section may be calculated in consideration of the consumption/regeneration energies in each section, a fuel/battery consumption ratio according to the driving load, and maximum/minimum SOCs (Operation S850). Operations S820 to S850 were described above in detail with reference to FIGS. 5A-7B, and a redundant description thereof will thus be omitted because it is considered to be unnecessary.

When the consumption energy and the regeneration energy in each section in consideration of the SOC may be determined, energy consumption on each path may be calculated by summing the consumption energies and the regeneration energies in the respective sections of each path (Operation S860), and a path having the lowest energy consumption may be determined by comparing the energy consumptions on the respective paths (Operation S870).

Information regarding the determined path may be output to the outside (e.g., the navigation system), and guidance of the path having the minimized energy consumption may be provided to a driver. Through the above-described path search method, an optimum path may be provided to a driver intending to minimize energy consumed to reach a destination regardless of time and distance, using characteristics (e.g., ISG, regenerative braking, efficiency characteristics, etc.) of hybrid electric vehicles using both an internal combustion engine and a motor and various information (e.g., precise traffic information, road slopes, weather, etc.).

For example, a section, in which a vehicle stoppage situation caused by traffic lights, congested areas, etc. is continued but energy may be effectively used, may be selected to minimize energy consumption in this section even if the time required to pass through the section is longer. Further, since regeneration efficiency is considered, a path having a high downward slope may be searched and, thus, regeneration energy may be maximized. In particular, in a section having a high SOC, a path on which a downhill section comes after an uphill section rather than a path on which an uphill section comes after a downhill section may be searched in consideration of a limit in a quantity of regeneration and, in a section having a low SOC, a path on which an uphill section comes after a downhill section rather than a path on which a downhill section comes after an uphill section may be searched to secure the SOC.

The above-described method in accordance with the exemplary embodiment of the present invention may be implemented as computer readable code in a computer readable recording medium in which a program is recorded. Computer readable recording media include all types of recording devices in which data readable by computer systems is stored. For example, the computer readable recording media may include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a hybrid electric vehicle in accordance with at least one exemplary embodiment of the present invention may effectively search for a path. Therefore, improvement in fuel efficiency on an actual road and environment protection effects may be expected.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A method of searching for a path of a hybrid electric vehicle, comprising:
acquiring, by a controller, driving environment information;
determining, by the controller, a driving load of the vehicle in each of a plurality of sections of at least one path from a point of departure to a destination;
determining, by the controller, output energy and brake energy in each of the sections based on the determined driving load;
determining, by the controller, consumption energy and regeneration energy in each of the sections based on the output energy and the brake energy in each of the sections;
determining, by the controller, energy consumption on each of the at least one path by summing the consumption energies and the regeneration energies in the sections;
determining, by the controller, an energy minimization path by comparing the determined energy consumptions on the at least one path;
determining, by the controller, a state of charge (SOC) of a battery in each of the sections; and
correcting, by the controller, the consumption energy and the regeneration energy in each of the sections according to the determined SOC,
wherein the determination of the energy consumption is executed based on the corrected consumption energy and regeneration energy in each of the sections,
wherein the determination of the SOC of the battery includes:
determining, by the controller, a ratio of fuel consumption energy and battery consumption energy;
determining, by the controller, the battery consumption energy by applying the determined ratio to the consumption energy in each of the sections; and
determining, by the controller, change of the SOC by reflecting the determined battery consumption energy sand the regeneration energy in each of the sections,
wherein the determination of the SOC of the battery further comprises:
determining, by the controller, a state of charge (SOC) change in each of the sections according to the determined battery consumption energy and the regeneration energy; and
determining, by the controller, whether the SOC in each of the sections deviates from a range between a predetermined minimum SOC value and a predetermined maximum SOC value by the determined SOC change,
wherein the correction of the consumption energy and the regeneration energy is executed in a section in which the SOC deviates from the range between the minimum SOC value and the maximum SOC value by the determined SOC change,
wherein the correction of the consumption energy and the regeneration energy includes:
correcting, by the controller, the battery consumption energy in a corresponding section to zero if the SOC becomes less than the minimum SOC value by the determined SOC change; and
correcting, by the controller, the entirety of the consumption energy in the corresponding section to the fuel consumption energy.

2. The method according to claim 1, wherein the driving environment information includes traffic information, geographic information and weather information.

3. The method according to claim 1, wherein the determination of the consumption energy and the regeneration energy in each of the sections includes:
determining, by the controller, the consumption energy by dividing the consumption energy by an output efficiency factor; and
determining, by the controller, the regeneration energy by multiplying the regeneration energy by a regeneration efficiency factor.

4. The method according to claim 1, wherein the correction of the consumption energy and the regeneration energy includes:
setting, by the controller, the SOC in a corresponding section to the predetermined maximum SOC value if the SOC becomes greater than the maximum SOC value by the determined SOC change.

5. A non-transitory computer readable recording medium having a program recorded therein for path searching of a hybrid electric vehicle, wherein when executed the program is configured to:
acquire driving environment information;
determine a driving load of the vehicle in each of a plurality of sections of at least one path from a point of departure to a destination;
determine output energy and brake energy in each of the sections based on the determined driving load;
determine consumption energy and regeneration energy in each of the sections based on the output energy and the brake energy in each of the sections;
determine energy consumption on each of the at least one path by summing the consumption energies and the regeneration energies in the sections;
determine an energy minimization path by comparing the determined energy consumptions on the at least one path,
determine a state of charge (SOC) of a battery in each of the sections; and
correct the consumption energy and the regeneration energy in each of the sections according to the determined SOC,
wherein the determination of the energy consumption is executed based on the corrected consumption energy and regeneration energy in each of the sections,
wherein when executed the program for determining the SOC of the battery configured to includes:
determine a ratio of fuel consumption energy and battery consumption energy;
determine the battery consumption energy by applying the determined ratio to the consumption energy in each of the sections; and determine change of the SOC by reflecting the determined battery consumption energy and the regeneration energy in each of the sections,
wherein the determination of the SOC of the battery further comprises:
   determine a state of charge (SOC) change in each of the sections according to the determined battery consumption energy and the regeneration energy; and
   determine whether the SOC in each of the sections deviates from a range between a predetermined minimum SOC value and a predetermined maximum SOC value by the determined SOC change,
wherein the correction of the consumption energy and the regeneration energy is executed in a section in which the SOC deviates from the range between the minimum SOC value and the maximum SOC value by the determined SOC change,
wherein when executed the program for the correction of the consumption energy and the regeneration energy includes:
   correct the battery consumption energy in a corresponding section to zero if the SOC becomes less than the minimum SOC value by the determined SOC change; and
   correct the entirety of the consumption energy in the corresponding section to the fuel consumption energy.

6. A hybrid electric vehicle, comprising:
a first controller configured to acquire driving environment information; and
a second controller configured to determine an energy minimization path using the driving environment information and to transmit information regarding the determined energy minimization path to the first controller,
wherein the second controller includes:
a driving load calculation unit configured to determine a driving load of the vehicle in each of a plurality of sections of at least one path from a point of departure to a destination using the driving environment information received from the first controller;
an output/brake energy calculation unit configured to determine output energy and brake energy in each of the sections based on the determined driving load;
a consumption/regeneration energy calculation unit configured to calculate consumption energy and regeneration energy in each of the sections based on the output energy and the brake energy in each of the sections; and
a path determination unit configured to determine energy consumption on each of the at least one path by summing the consumption energies and the regeneration energies in the sections, and to determine the energy minimization path by comparing the determined energy consumptions on the at least one path,
wherein the consumption/regeneration energy calculation unit is configured to determine a state of charge (SOC) of a battery in each of the sections, correct the consumption energy and the regeneration energy in each of the sections according to the determined SOC, and determine the energy consumption on each of the at least one path based on the corrected consumption energy and regeneration energy in each of the sections,
wherein the consumption/regeneration energy calculation unit is configured to determine a ratio of fuel consumption energy and battery consumption energy, determine the battery consumption energy by applying the determined ratio to the consumption energy in each of the sections, and determine change of the SOC by reflecting the determined battery consumption energy and the regeneration energy in each of the sections,
wherein the consumption/regeneration energy calculation unit is configured to determine a state of charge (SOC) change in each of the sections according to the determined battery consumption energy and the regeneration energy, and determine whether the SOC in each of the sections deviates from a range between a predetermined minimum SOC value and a predetermined maximum SOC value by the determined SOC change,
wherein the consumption/regeneration energy calculation unit is configured to execute the correction in a section in which the SOC deviates from the range between the minimum SOC value and the maximum SOC value by the determined SOC change, and
wherein if the SOC becomes less than the minimum SOC value by the determined SOC change the consumption/regeneration energy calculation unit is configured to correct the battery consumption energy in a corresponding section to zero and correct the entirety of the consumption energy in the corresponding section to the fuel consumption energy.

7. The hybrid electric vehicle according to claim 6, wherein the driving environment information includes traffic information, geographic information and weather information.

8. The hybrid electric vehicle according to claim 6, wherein the consumption/regeneration energy calculation unit is configured to determine the consumption energy by dividing the consumption energy by an output efficiency factor and determines the regeneration energy by multiplying the regeneration energy by a regeneration efficiency factor.

9. The hybrid electric vehicle according to claim 6, wherein if the SOC becomes greater than the maximum SOC value by the determined SOC change the consumption/regeneration energy calculation unit is configured to set the SOC in a corresponding section to the maximum SOC value.

* * * * *